United States Patent
Evans

(10) Patent No.: US 9,732,626 B2
(45) Date of Patent: Aug. 15, 2017

(54) TURBOMACHINE CASING ASSEMBLY

(71) Applicant: ROLLS-ROYCE PLC, London (GB)

(72) Inventor: Dale Edward Evans, Derby (GB)

(73) Assignee: ROLLS-ROYCE plc, London (GB)

( * ) Notice: Subject to any disclaimer, the term of this patent is extended or adjusted under 35 U.S.C. 154(b) by 1079 days.

(21) Appl. No.: 13/660,186

(22) Filed: Oct. 25, 2012

(65) Prior Publication Data

US 2013/0336761 A1   Dec. 19, 2013

(30) Foreign Application Priority Data

Nov. 22, 2011   (GB) .................................. 1120105.0

(51) Int. Cl.
*F01D 21/04*   (2006.01)
*F01D 25/24*   (2006.01)

(52) U.S. Cl.
CPC .......... *F01D 21/045* (2013.01); *F01D 25/24* (2013.01); *Y02T 50/672* (2013.01)

(58) Field of Classification Search
CPC ........ F01D 21/045; F01D 25/24; F01D 25/28; F01D 25/285; F05D 2220/32; F05D 2220/323; F05D 2220/36; F05D 2240/14; F05D 2260/311
USPC ..................................................... 415/9, 220
See application file for complete search history.

(56) References Cited

U.S. PATENT DOCUMENTS

| | | | |
|---|---|---|---|
| 1,698,514 A * | 1/1929 | Schmidt | F01D 21/045 415/9 |
| 4,149,824 A * | 4/1979 | Adamson | F01D 21/006 415/197 |
| 4,377,370 A * | 3/1983 | Porcelli | F01D 21/045 415/121.2 |
| 4,503,667 A * | 3/1985 | Roberts | F01D 21/045 415/9 |
| 4,505,104 A * | 3/1985 | Simmons | F01D 21/045 415/9 |
| 4,639,188 A * | 1/1987 | Swadley | F01D 21/045 415/196 |
| 5,259,724 A * | 11/1993 | Liston | F01D 21/045 415/119 |
| 5,273,393 A * | 12/1993 | Jones | F01D 21/045 415/9 |
| 5,336,044 A * | 8/1994 | Forrester | F01D 21/045 415/196 |

(Continued)

FOREIGN PATENT DOCUMENTS

| | | |
|---|---|---|
| EP | 1 083 300 A3 | 3/2001 |
| EP | 2 149 680 A2 | 2/2010 |

OTHER PUBLICATIONS

Feb. 23, 2012 Search Report issued in British Patent Application No. GB1120105.0.

*Primary Examiner* — Craig Kim
*Assistant Examiner* — Wayne A Lambert
(74) *Attorney, Agent, or Firm* — Oliff PLC

(57) ABSTRACT

A turbomachine casing assembly includes a first casing element locatable radially outward of one or more rotating aerofoil elements of a turbomachine, a second casing element located radially distal to the first casing element and one or more arcuate fence elements positioned between the first and second casing elements. Following impact of a detached fan blade, a radially outward movement of the first casing element causes the or each fence element to project into the air flow passing through the turbomachine.

9 Claims, 3 Drawing Sheets

(56) References Cited

U.S. PATENT DOCUMENTS

| | | | | |
|---|---|---|---|---|
| 5,516,258 A * | 5/1996 | Newton | ............... | F01D 21/045 415/200 |
| 5,823,739 A * | 10/1998 | Van Duyn | ............. | F01D 21/045 415/9 |
| 6,227,794 B1 * | 5/2001 | Wojtyczka | ............ | F01D 11/122 415/173.4 |
| 6,575,694 B1 * | 6/2003 | Thompson | ............ | F01D 21/045 415/173.4 |
| 6,637,186 B1 * | 10/2003 | Van Duyn | ............... | F01D 11/12 415/9 |
| 7,008,173 B2 * | 3/2006 | Gabrys | ................ | F01D 21/045 415/9 |
| 7,959,405 B2 * | 6/2011 | Launders | ............. | F01D 21/045 415/9 |
| 8,016,543 B2 * | 9/2011 | Braley | ................. | F01D 21/045 415/173.4 |
| 8,047,764 B2 * | 11/2011 | Launders | ............. | F01D 21/045 415/1 |
| 2011/0033292 A1 * | 2/2011 | Huth | .................... | F01D 21/045 416/1 |
| 2011/0076132 A1 * | 3/2011 | Bottome | .............. | F01D 21/045 415/9 |
| 2013/0136577 A1 * | 5/2013 | Evans | .................. | F01D 21/045 415/9 |

* cited by examiner

TURBOMACHINE CASING ASSEMBLY

This invention claims the benefit of UK Patent Application No. 1120105.0, filed on 22 Nov. 2011, which is hereby incorporated herein in its entirety.

FIELD OF THE INVENTION

This invention relates to a turbomachine casing assembly and particularly, but not exclusively, to a casing assembly for the fan of a turbofan gas turbine engine.

BACKGROUND

Turbofan gas turbine engines for powering aircraft generally comprise inter alia a core engine, which drives a fan. The fan comprises a number of radially extending fan blades mounted on a fan rotor which is enclosed by a generally cylindrical fan casing.

There is a remote possibility with such engines that part or all of a fan blade could become detached from the remainder of the fan, for example as a result of the engine ingesting a bird or other foreign object.

It is known to provide the fan casing with a fan track liner which incorporates a containment system, designed to contain any released blades or associated debris. FIG. 1 shows a partial cross-section of such a known fan track liner.

In the event of a "fan blade off" (FBO) event, the detached fan blade 8 travels radially outward, penetrating the attrition liner 10, septum 12 and aluminium honeycomb layer 14 until it reaches the metallic fan casing 16. The fan blade 8 then travels forwards where it is trapped by the hook 18. The fan track liner must therefore be relatively weak in order that any released blade or fragment thereof can penetrate sufficiently to be restrained axially whilst the liner distributes the load applied to the casing barrel as the radial restraint.

In addition to providing a blade containment system, the fan track liner includes an annular layer of abradable material which surrounds the fan blades. During operation of the engine, the fan blades cut a path into this abradable layer creating a seal against the fan casing and minimising air leakage around the blade tips.

The fan track liner must also be resistant to ice impact loads. A rearward portion of the fan track liner is conventionally provided with an annular ice impact panel. This may typically be a glass-reinforced plastic moulding which may, in turn, be filled with a high density composite material to increase its impact strength. Ice that forms on the fan blades is acted on by both centrifugal and airflow forces, which respectively cause it to move outwards and rearwards before being shed from the blades.

The geometry of a conventional fan blade is such that the ice is shed from the trailing edge of the blade, strikes the ice impact panel and is deflected without damaging the panel.

Swept fan blades are increasingly used in turbofan engines as they offer significant advantages in efficiency over conventional fan blades. Swept fan blades have a greater chord length at their central portion than conventional fan blades. This greater chordal length means that ice that forms on a swept fan blade follows the same rearward and outward path as on a conventional fan blade but may reach the radially outer tip of the blade before it reaches the trailing edge. It will therefore be shed from the blade tip and may strike the fan track liner forward of the ice impact panel.

A conventional fan track liner is generally not strong enough along its forward region to withstand ice impact and is therefore generally not suitable for use with swept fan blades. It is not possible simply to strengthen the fan track liner to accommodate ice impact, because this may disrupt the blade trajectory during an FBO event, and thereby compromise the operation of the fan casing containment system.

In recent years there has been a trend towards the use of thinner fan blades for performance. Thinner fan blades are more likely to buckle than to penetrate a fan track liner which has been optimised for swept fan blade ice impact durability. This may result in undesirable, forward ejection of high kinetic energy debris through the engine intake.

It is an objective of this invention to provide a gas turbine engine containment assembly that will substantially overcome the problems described above and that is suitable for any fan blade design.

STATEMENTS OF INVENTIONS

According to a first aspect of the present invention there is provided a turbomachine casing assembly, comprising:
- a first casing element located radially outward of one or more rotating aerofoil elements of a turbomachine, and having a first end;
- a second casing element located radially distal to the first casing element; and
- an arcuate fence element, provided between a radially proximal face of the first casing element and a radially proximal face of the second casing element, at the first end of the first casing element, the fence element having a first end and a second end;
- whereby upon failure of one of the rotating aerofoil elements, the first casing element urges the first end of the fence element in a radially outward direction causing the fence element to rotate and the second end of the fence element to project radially inwards of the radially proximal face of the first casing element.

The casing assembly of the present invention enables a detached fan blade to deflect the first casing element at a first, or forward, end sufficiently far to cause the fence element to project radially inwards thereby creating a barrier to trap the fan blade. The force required to cause this deflection is significantly greater than the force resulting from the impact of ice shed from the fan blades.

Thus the competing requirements of fan blade ice shedding loads and fan blade off loads may be accommodated in a way that was not previously possible. The manner in which this is done allows for the potential to tune the casing assembly to correctly service each requirement and does so whilst saving weight and easing manufacture.

Optionally, the turbomachine casing assembly further comprises a plurality of arcuate fence elements.

In one embodiment of the invention, the arcuate fence elements are formed from a ductile material such as steel. Deformation of the fence elements, following a blade impact, results in the absorption of energy in the plastic deformation of each of the fence elements as they are projected radially inwards of the first casing element.

In an alternative embodiment, the fence elements may be formed from an alternative ductile material in which the impact energy of the detached blade can be absorbed through plastic deformation of the fence elements, with the radially inward projection of the second end of the fence element again creating a barrier to thereby trap the detached blade.

Optionally, the or each fence element comprises a frangible spigot which abuts against a first end of the second casing element.

The frangible spigot abuts the first end of the second casing element to thereby retain the first casing element in its radial position in the casing assembly. While the ice impact loads are insufficient to detach the frangible spigot from the fence element, the impact load associated with a detached fan blade causes the spigot to snap off the fence element allowing the fence element to project radially inwards and thereby trap the fan blade. A series of radially arranged fasteners may be used to connect the spigot to the fence elements.

Optionally, the second end of each fence element is positioned flush with the first end of the second casing element and the radially proximal face of the first casing element. The frangible spigot is positioned on a radially distal face of the fence element at a distance from the second end of the fence element which results in the second end being aligned with the first ends of each of the first and second casing elements.

The alignment of the second end of the fence element with the first ends of each of the first and second casing elements results in the formation of a smooth, uninterrupted surface across which the gas flow through the rotating aerofoil elements may pass. This minimises the surface drag across the surface corresponding to the radially proximal face of the first casing element and thereby improves the efficiency of the engine.

Optionally, the plurality of fence elements is arranged as a circumferential array.

By arranging the plurality of fence elements as a circumferential array the resulting casing assembly is able to accommodate the detachment of a fan blade at any point around its circumference.

Optionally, an edge of the second end of each fence element overlaps a corresponding opposing edge of the second end of each adjacent fence element.

In an embodiment of the invention, the plurality of fence elements are arranged in a circumferential array with one lateral edge of one fence element overlapping a corresponding opposite edge of an adjoining fence element. In this way, the array of fence elements is arranged circumferentially around the casing assembly in a continuous lapped fashion.

This arrangement of the fence elements means that when one fence element is deflected as a result of the impact of a detached fan blade, it initiates a deflection of the adjoining fence element. The detached fan blade has a circumferential velocity which results in an uninterrupted sequence of deflections of adjoining fence elements. The resulting radially inward projection of the fence elements thus serves to trap the detached fan blade.

Optionally, the or each fence element comprises a first portion and a second portion, with respective first and second portions being connected to one another.

In one embodiment of the invention, the first and second portions are connected to one another by means of a hinged connection. The hinged connection may incorporate an element of frictional resistance to the relative motion between the first and second portions. Such an arrangement ensures that following impact of a detached fan blade, the motion of the fence element follows a pre-determined path, i.e. radially outward movement of the first end, relative movement between the first and second portions, rotation of the fence element as a whole and radially inward projection of the second end.

In another embodiment of the invention, the first and second portions may be rigidly connected to one another.

Optionally, the first casing element further comprises a radially distal face having a fence portion, the fence portion extending from a first end of the first casing element and having a serpentine profile, the fence portion comprising the fence element.

The fence portion may be formed as a forward portion of a distal face of the first casing element. In such an arrangement, the distal face has a serpentine profile as it extends rearwards from the first end of the first casing element. A forward arcuate portion of the distal face comprises the fence element. In this manner, the fence element is formed integrally with the distal face of the first casing element. By forming the fence element as an integral part of the first casing element, the casing assembly can be made simpler and easier to manufacture.

Optionally, the fence element comprises a frangible spigot which abuts against a first end of the second casing element.

Optionally, the second end of the fence element is positioned flush with the first end of the second casing element and the radially proximal face of the first casing element.

According to a third aspect of the present invention there is provided a jet engine fan casing comprising the turbomachine casing assembly according to the first aspect of the invention.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of preferred embodiments of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
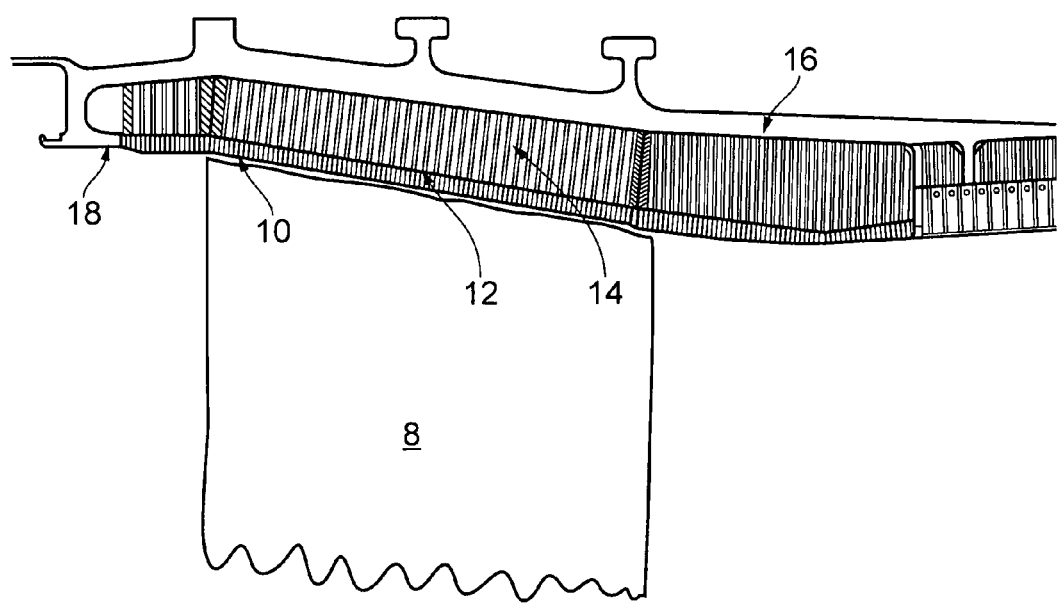
FIG. 1 shows a partial, sectional view of a known fan casing assembly as used in a gas turbine engine casing.
Figure 2:
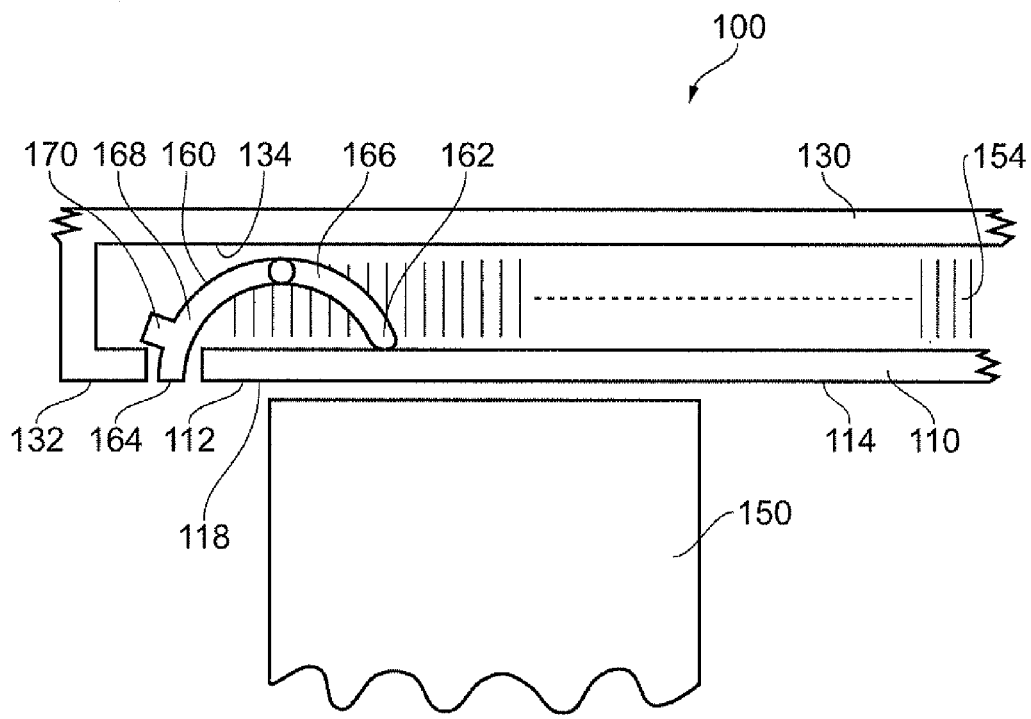
FIG. 2 shows a partial, sectional view of a fan casing assembly according to a first embodiment of the invention.
Figure 3:
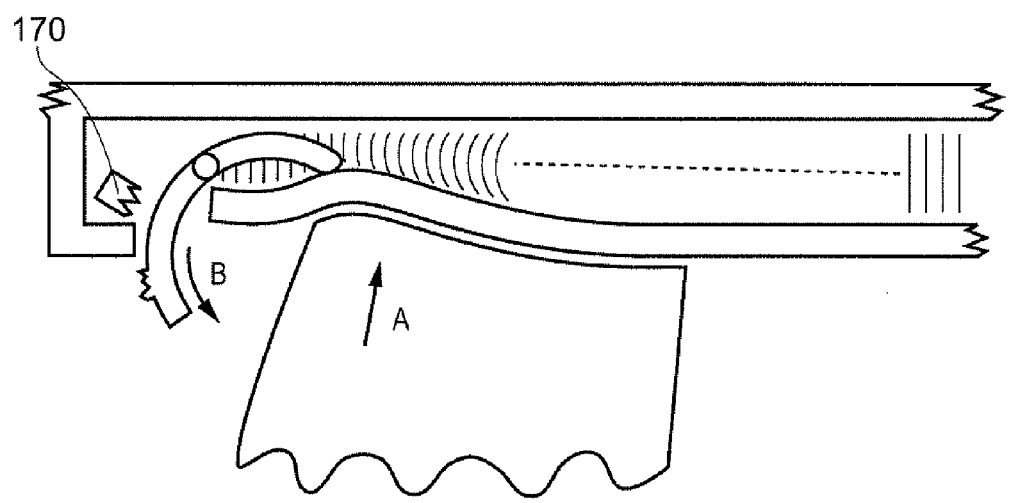
FIG. 3 shows a partial, sectional view of the fan casing assembly of FIG. 2 showing the impact of a fan blade.

Referring to FIGS. 2 and 3, a fan casing assembly according to a first embodiment of the invention is designated generally by the reference numeral 100 and comprises a first casing element 110 and a second casing element 130.

The first casing element 110 has a first end 112, a radially proximal face 114, and the second casing element 130 has a first end 132 and a radially proximal face 134.

The first casing element 110 at least partially encloses one or more rotating aerofoil structures 150. These aerofoil structures 150 may comprise blades of a turbomachine, in particular the compressor fan blades of a gas turbine engine. The second casing element 130 is disposed radially distal to the first casing element 110.

The turbomachine casing assembly 100 comprises a plurality of first casing elements 110 circumferentially disposed about a curve defined by the blade tip path of the one or more aerofoil structures 150 of the turbomachine.

The first casing element 110 is typically formed as a filled Nomex honeycomb material, while the second casing element 130 may be metallic and may, for example, be formed of aluminium, titanium, steel or any other suitable metal.

Each first casing element 110 comprises a radially proximal face 114 in the form of an abradable layer 118. An infill member 154 is positioned between the first and second casing elements 110,130 and is attached to the abradable layer 118. An exemplary material for the abradable layer 118 is an epoxy resin, which may be curable at room temperature. The abradable layer 118 provides a surface against which the fan blades 150 are able to rub and cut a path for itself. For example, the fan blades 150 may rub against the abradable layer 118 and form a seal during normal engine operation.

The infill member 154 may be formed from a frangible or crushable structure, such as a foam or honeycomb material which provides structural reinforcement. The honeycomb material may be formed from a metal, such as aluminium, or from a non-metallic material, such as Nomex™ (a flame resistant aramid material).

In an alternative embodiment of the invention, the infill member 154 may be formed separately from the first casing element 110, and positioned between the first and second casing elements 110,130.

Optionally, a septum layer (not shown) may be provided as an interlayer between the abradable layer 118 and the infill member 154. The septum layer may be metallic or may be formed from a carbon fibre or glass fibre reinforced composite material.

The first end 112 of the first casing element 110 is aligned with the first end 132 of the second casing element 120 and is maintained in its radial position relative to the fan blades 150 by a plurality of arcuate fence elements 160.

Each of the fence elements 160 comprise a first portion 166 and a second portion 168, with respective first and second portions 166,168 being connected to one another. Each fence element 160 further comprises a first end 162 corresponding to the first portion 166, and a second end 164 corresponding to the second portion 168.

Each fence element 160 is positioned between the first and second casing elements 110,130, with its first and second ends 162,164 facing towards the first casing element 110. The first end 162 abuts against the radially proximal face 114 of the first casing element 110. The second end 164 is positioned between the first end 112 of the first casing element 110, and the first end 132 of the second casing element 130.

Each fence element 160 has a frangible spigot 170 formed on the convex face of the fence element 160 and positioned towards the second end 164. The frangible spigot 170 locates against the second end 132 of the second casing element 130, such that the respective first ends 112,132, second end 164 of each of the first casing element 110, second casing element 130 and fence element 160 align to form a smooth, uninterrupted surface.

In this embodiment, the frangible spigot 170 is attached to the second end 132 of the second casing element 130 with radially positioned fasteners (not shown) to simplify removal of individual first casing elements, for example for maintenance purposes.

In use, when a fan blade 150 becomes detached, it travels in a generally radially outward direction as indicated by the arrow A in FIG. 3. The detached blade first strikes the proximal face 114 of the forward portion of the first casing element 110. The energy associated with this impact event is then transferred to the first ends 162 of the fence elements 160, which each move radially outwards. This causes each of the fence elements 160 to rotate (about a common "annular" axis of rotation) and results in the second ends 164 of the fence elements 160 being forced in a radially inward direction, as indicated by the arrow B in FIG. 3. In doing so, the frangible spigot 170 is sheared from the convex surface of each fence element 160. As the second ends 164 of the fence elements 160 move radially inwards, they protrude into the path of the air flow passing through the rotating aerofoil structure 150. As the detached blade 150 continues to travel radially outwards, the blade tip engages with the protruding second end 164 of the fence element 160 and subsequently becomes trapped in the casing assembly 100.

Figure 4:
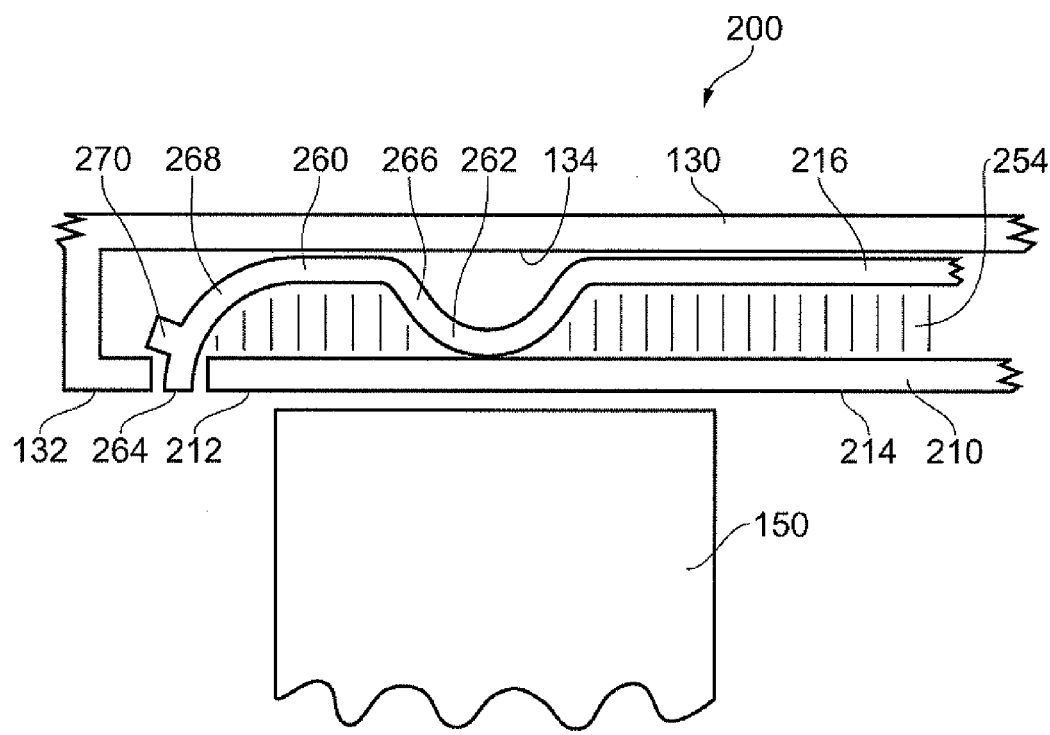
FIG. 4 shows a partial, sectional view of a fan casing assembly according to a second embodiment of the invention.
Figure 5:
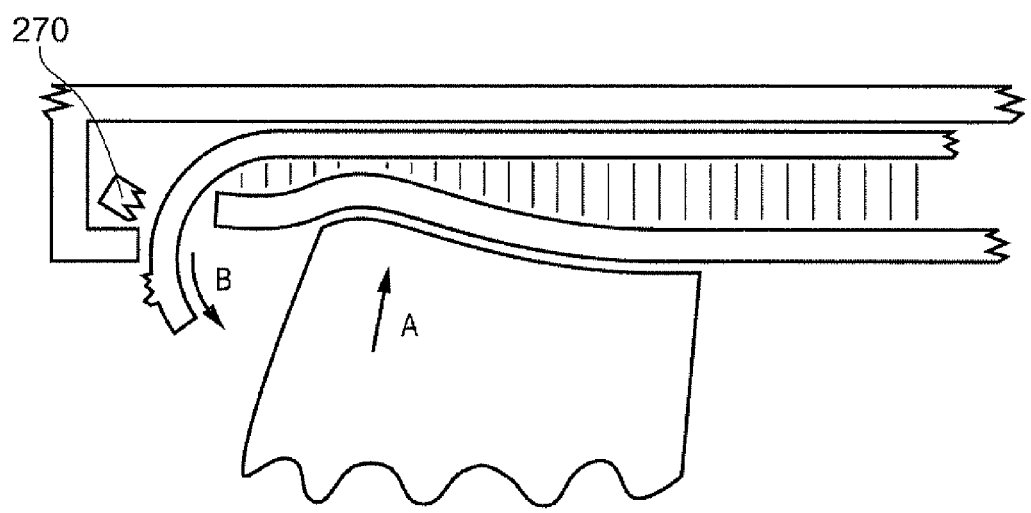
FIG. 5 shows a partial, sectional view of the fan casing assembly of FIG. 4 showing the impact of a fan blade.

Referring to FIGS. 4 and 5, a fan casing assembly according to a second embodiment of the invention is designated generally by the reference numeral 200. Features of the fan casing assembly 200 which correspond to those of fan casing assembly 100 have been given corresponding reference numerals for ease of reference.

The fan casing assembly 200 has a first casing element 210 and a second casing element 130.

In this embodiment, the first casing element 210 has a first end 212, a radially proximal face 214 and a radially distal face 216. The radially proximal face 214 comprises an abradable layer 118. The radially distal face 216 of the first casing element 210 corresponds generally to a radially proximal face 134 of the second casing element 130.

The radially proximal and distal faces 214,216 of the first casing element 210 are spaced radially apart from one another with an infill member 254 positioned therebetween.

The radially distal face 216 of the first casing element 210 extending from the first end 212 of the first casing element 210 has a serpentine profile and is formed as a fence element 260. The fence element 260 comprises a first portion 266 and a second portion 268, formed contiguously with one another. The fence element further comprises a first end 262 corresponding to the first portion 266, and a second end 264 corresponding to the second portion 268.

The fence element 260 is formed such that each of the first and second ends 262,264 faces towards the radially proximal face of the first casing element 210. The first end 262 abuts against the radially proximal face 214 of the first casing element 210. The second end 264 is positioned between the first end 212 of the first casing element 210, and the first end 132 of the second casing element 130.

The fence element 260 has a frangible spigot 270 formed on the convex face of the fence element 260 towards the second end 264. The frangible spigot 270 locates against the first end 132 of the second casing element 130, such that the first ends 212,132, second end 264 of each of the first casing element 210, second casing element 130 and fence element 260 align to form a smooth, uninterrupted surface. As described above in relation to the first embodiment, the frangible spigot 270 can be fastened to the first end 132 of the second casing element 130 to allow for the removal of individual first casing elements 210 for maintenance or repair.

In use, when a fan blade 150 becomes detached, it travels in a generally radially outward direction as indicated by the arrow A in FIG. 5. The detached blade first strikes the proximal face 214 of the forward portion of the first casing element 210. The energy associated with this impact event is then transferred to the distal face 216 of the first casing element 210, via the first end 264 of the fence element 260, which moves radially outwards. This causes the serpentine portion of the distal face 216 of the first casing element 210 to straighten out. This, in turn, results in the second end 264 of the fence element 260 being forced in a radially inward direction, as indicated by the arrow B in FIG. 5. In doing so, the frangible spigot 270 is sheared from the convex face of the fence element 260.

As the second end 264 of the fence element 260 moves radially inward, it protrudes into the path of the air flow passing through the rotating aerofoil structure 150. As the detached blade 150 continues to travel radially outwards, the blade tip engages with the protruding second end 264 of the fence element 260 and subsequently becomes trapped in the casing assembly 200.

The casing assemblies disclosed herein are equally applicable to solid and hollow fan blades and may be used with light-weight (hollow line-core or solid composite) fan blades. The casing assemblies may also be used with aerofoil structures, e.g. fan blades, comprising a foreign object damage resistant member at the front of the aerofoil structure, such as a picture frame or metallic sheath. The present disclosure may also be applied to swept or unswept aerofoil structures.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A turbomachine casing assembly, comprising:
   a first casing element located radially outward of one or more rotating aerofoil elements of a turbomachine, and having a first end;
   a second casing element located radially distal to the first casing element, and having a first end; and
   an arcuate fence element, provided between a radially proximal face of the first casing element and a radially proximal face of the second casing element, at the first end of the first casing element, the fence element being arcuate in an axial plane of the turbomachine casing assembly, the fence element having a first end and a second end with the first end of the fence element located radially distal to the first casing element, the first end of the fence element being positioned radially between the first casing element and the second casing element, the fence element having a frangible spigot formed on a convex face of the fence element and positioned towards the second end of the fence element, the frangible spigot being arranged to locate against the first end of the second casing element;
   wherein the first end of the first casing element is aligned with the first end of the second casing element, and the first end of the first casing element is maintained in its radial position relative to the one or more rotating aerofoil elements by the fence element; and
   wherein upon failure of one of the rotating aerofoil elements, the first casing element urges the first end of the fence element in a radially outward direction causing the fence element to rotate and the second end of the fence element to project radially inwards of the radially proximal face of the first casing element, with the radially inward movement of second end of the fence element causing the frangible spigot to be sheared from the convex surface of the fence element.

2. The turbomachine casing assembly as claimed in claim 1, comprising a plurality of arcuate fence elements.

3. The turbomachine casing assembly as claimed in claim 2, wherein the second end of each fence element is positioned flush with the first end of the second casing element and the radially proximal face of the first casing element.

4. The turbomachine casing assembly as claimed in claim 2, wherein the plurality of fence elements is arranged as a circumferential array.

5. The turbomachine casing assembly as claimed in claim 1, wherein the fence element comprises a first portion and a second portion, with respective first and second portions being connected to one another.

6. The turbomachine casing assembly as claimed in claim 1, the first casing element further comprising a radially distal face having a fence portion, the fence portion extending from a first end of the first casing element and having a serpentine profile, the fence portion comprising the fence element.

7. The turbomachine casing assembly as claimed in claim 6, wherein the second end of the fence element is positioned flush with the first end of the second casing element and the radially proximal face of the first casing element.

8. A jet engine fan casing comprising the turbomachine casing assembly as claimed in claim 1.

9. A gas turbine comprising a turbomachine casing assembly as claimed in claim 1.

* * * * *